United States Patent

Cappuccio et al.

[11] Patent Number: 5,328,066
[45] Date of Patent: Jul. 12, 1994

[54] CART DEVICE AND METHOD

[76] Inventors: Louis W. Cappuccio, 16 Mill Run Dr.; William J. Santora, 980 S. 2nd Rd., both of Hammonton, N.J. 08037

[21] Appl. No.: 735,863

[22] Filed: Jul. 25, 1991

[51] Int. Cl.⁵ ............................................. B60R 9/06
[52] U.S. Cl. ........................... 224/42.03 R; 224/42.08; 414/462; 414/786
[58] Field of Search ............... 224/42.03 R, 42.06, 224/42.07, 42.08, 42.03 A, 42.03 B, 42.45, 315, 42.31; 414/462, 786

[56] References Cited

U.S. PATENT DOCUMENTS

| | | | |
|---|---|---|---|
| 2,431,108 | 11/1947 | Carleton et al. | 224/42.03 R |
| 2,439,707 | 4/1948 | Wright | 224/29 |
| 2,663,474 | 12/1953 | Kelly | 224/42.03 |
| 2,762,542 | 9/1956 | Hodgeman | 224/42.03 |
| 3,443,730 | 5/1969 | Meusel | 224/42.03 |
| 3,525,461 | 8/1970 | Bronson | 224/315 |
| 4,044,471 | 8/1977 | Peterson | 33/141 |
| 4,262,831 | 4/1981 | Buchanan | 224/42.45 R |
| 4,400,129 | 8/1983 | Eisenberg et al. | 414/462 |
| 4,411,580 | 10/1983 | Kelly | 414/462 |
| 4,697,975 | 10/1987 | Lippold | 414/462 |
| 4,726,597 | 2/1988 | Hickin | 280/47.17 |
| 4,738,581 | 4/1988 | Kuhlman | 224/42.03 R X |
| 5,029,740 | 7/1991 | Cox | 224/42.08 X |

FOREIGN PATENT DOCUMENTS 0127428 5/1984 United Kingdom .

Primary Examiner—Michael S. Huppert
Assistant Examiner—Janice Krizek
Attorney, Agent, or Firm—Thomas A. Lennox

[57] ABSTRACT

A safety cart for use by repair persons along a travelled highway is constructed of heavy steel plate to carry cones, flags, and an illuminated sign from the repair vehicle up the road to warn approaching motorists of the work site. The cart is carried to the site while attached to the front of the repair vehicle and a support device is attached to the front of the vehicle which tilts down out of the way of the forwardly tilting engine hood. The cart includes a pivoting handle which pivots to bring an engaging rod upwardly to a height of mounting slots in the supporting device on the vehicle. The handle is then used as a lever to lift the safety cart upwardly to abut the support device on the vehicle to be releasably interlocked on the support device.

20 Claims, 4 Drawing Sheets

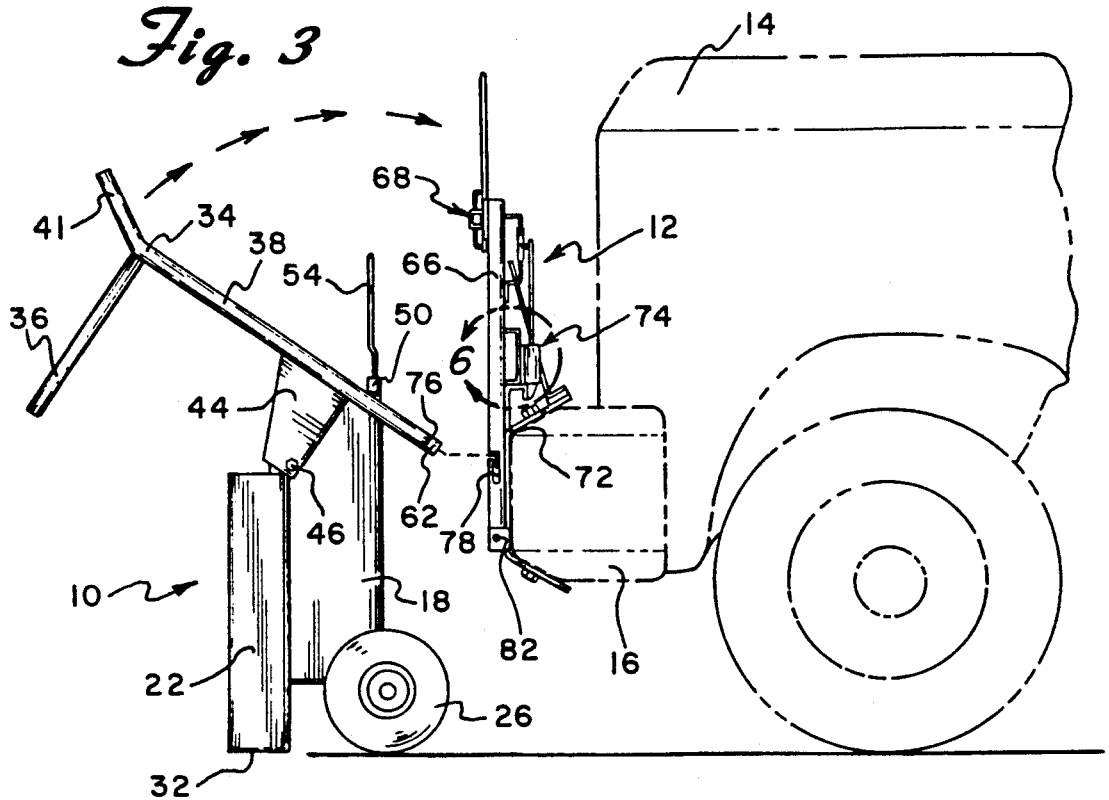
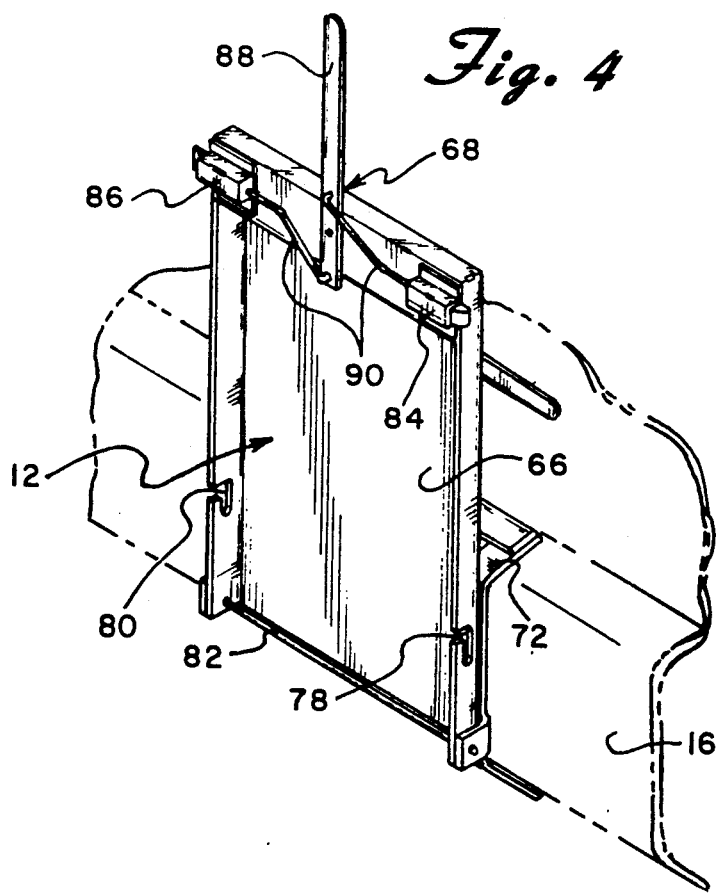

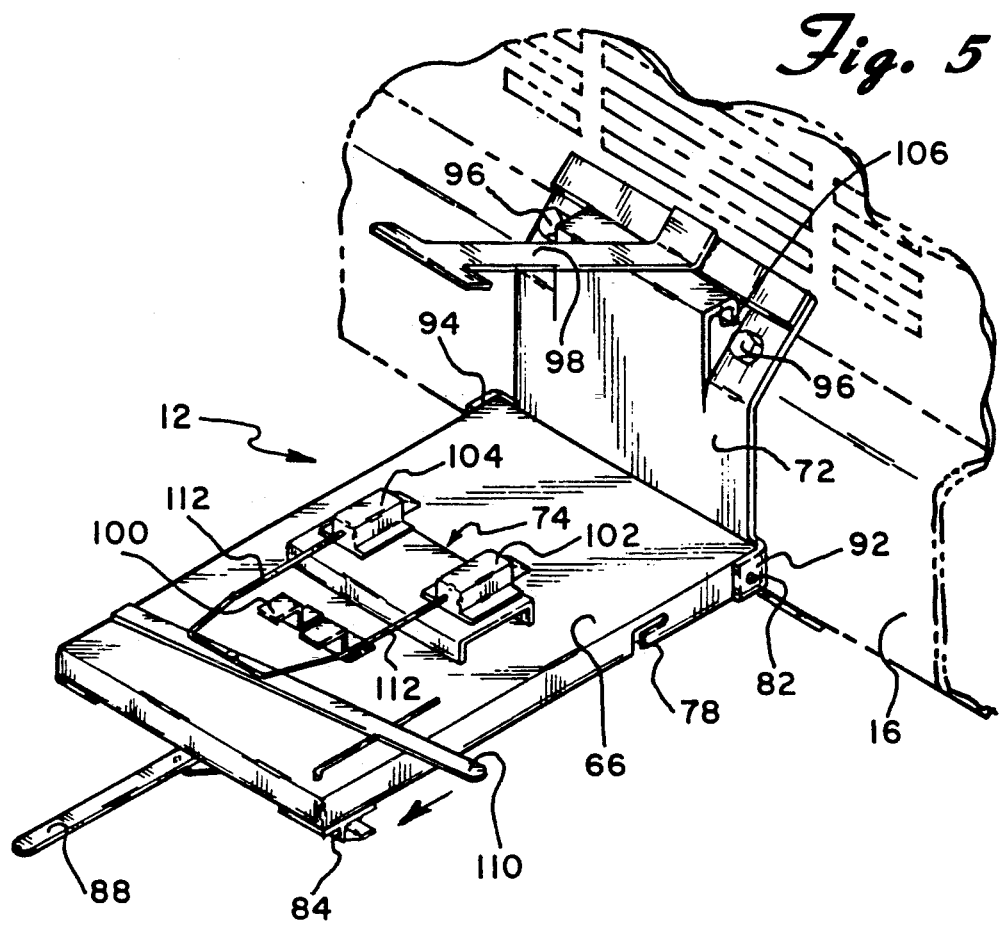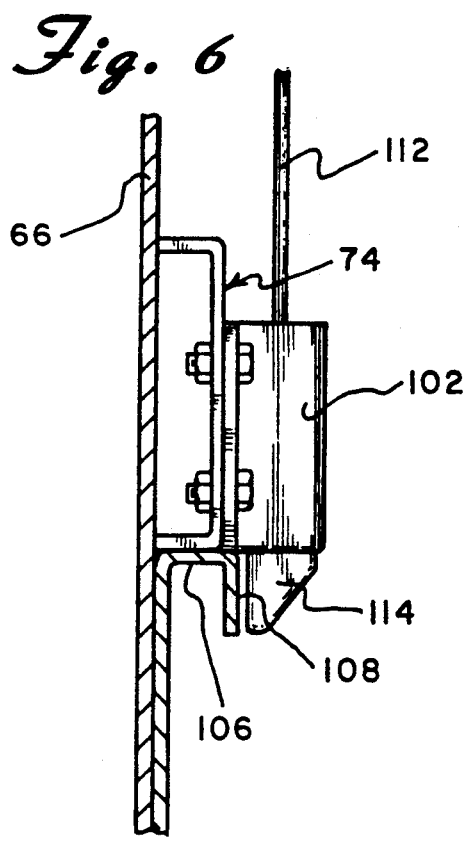

CART DEVICE AND METHOD

BACKGROUND OF THE INVENTION

This invention involves a cart device and a device for attachment of the cart to the outside of a motor vehicle. More specifically, this invention involves a safety cart attachable to the outside of a truck preparing to undertake work proximate a highway wherein the cart includes various safety devices including a warning sign on the cart itself.

There is a continuing need for workers and particularly repair persons to work immediately next to or even on a portion of a highway with motor vehicles continuing to travel along the highway while the work is being carried out. This work includes repair of electric lines, telephone lines, gas pipes, water pipes, sewer pipes, and the like. Many times, this work is of an emergency nature and is begun immediately upon the repair truck arriving at the scene. In order to warn and control traffic, it is common to set out signs warning approaching motorists of the encroachment onto the highway, many times narrowing the roadway by reducing at least one of the lanes of travel. The sign is placed at a certain distance while rubber or plastic brightly colored cones are used to delineate the work area and to move the motor vehicles into the more restricted travel lane. Sometimes flashing lights or even flares are used to warn the approaching motorists.

The problem with the present system is that the signs are typically not resistent to winds and are easily blown over, exacerbated by the air flow of passing motor vehicles. Further, the setting out of the signs and the cones is a particularly hazardous undertaking. Without the sign at the end, the passing motorist is not forewarned. Further, the repair person must make multiple trips carrying the sign and cones to various distances away from the work site. There is an additional problem in that repair persons are not necessarily skilled in estimating distances and it is most important that the sign and the cones be spaced sufficiently away from the work area to provide the motorist with sufficient warning.

None of the prior devices satisfy these needs nor do they attain the objects described hereinbelow.

SUMMARY OF THE INVENTION

Although the cart device described in detail is a safety cart to carry cones, signs, flashing lights and other equipment along a roadway of a work site, it should be understood that the cart device of the present invention is not so limited when the structure leveraging the cart onto the vehicle and interlocking it on to the vehicle is discussed. Numerous additional uses and configurations are available including a water cart to be carried to the work site on an agricultural farm for use by the field workers wherein the wheels allow the cart to be moved to a convenient and protected location. Likewise, containers carrying other fluids such as fuel may be conveniently carried on the truck to the location and wheeled to the necessary location. An additional use of the cart is as a reel cart to support a heavy reel of electric or telephone cables. The reel may be held on the cart so that it will rotate to play out the cable from a position when the cart is placed. The leveraging mechanism allows the cart to be lifted onto and interlock onto the truck. Whenever the term "cart" is utilized, it is intended to refer to a carrying device having two or more wheels.

An aspect of this invention is to provide a cart to hold various safety devices including cones, flares, flags, lights, flashing lights, and the like. The safety cart must not only be capable of carrying these objects which together are quite heavy, but it also must withstand the wind and the air currents caused by passing motorists as it is set up as the lead sign warning of the work area impinging on the roadway up ahead.

It is therefore an object of the present invention to provide a cart containing and supporting all of the various safety devices necessary to set up a work area along a roadway but also to provide means of carrying that cart to the work site. Commonly, the trucks neither have the room nor are they designed to hold such a safety cart. Therefore, it is an object of this invention to provide a cart and a mechanism to fix the cart to the outside of the repair vehicle, most commonly to the front of the vehicle.

Since the cart, particularly filled with the safety apparatus is quite heavy, and it is necessary to support the cart at a height so that it will not interfere with movement of the motor vehicle, it is an object to provide a device to lift the cart to that height and releasably fix it on the motor vehicle.

It is an additional object of the present invention to provide an attachment device to the vehicle which will allow it to be tilted downwardly to allow the hood of the repair vehicle to be opened without removing the safety cart from the front the vehicle.

It is a particular object of the present invention to provide a safety cart which can be removed from the vehicle or reattached to the vehicle by a single person despite the fact that the weight of the cart and its contents is well above the weight a person could safely lift.

An aspect of the invention is a cart device that includes support means attachable to an outside portion of a motor vehicle to releasably support a cart off the ground on the outside of the motor vehicle. The support means includes mounting means to provide both vertically upward and horizontal support and means to releasably interlock the cart against the support means and prevent vertically upward movement of the cart in relation to the mounting means. The cart includes a body that includes a platform, at least two wheels rotatably attached to the body sufficient to allow the body to be moved on the wheels, engaging means attached to the body to demountably engage to the mounting means on the support means, and leveraging means attached to the body to provide leverage to lift the cart upwardly to the support means while the engaging means is engaged in the mounting means to support the cart on the support means.

It is preferred that the support means further include a base panel and means to attach the base panel to the outside portion of a motor vehicle. It is further preferred that the support means further includes a support panel that includes a lower edge, an upper edge, the mounting means, and the means to releasably interlock the cart to the support means interlocks the cart to the support panel. It is also preferred that the support means further includes hinge attachment means to hingeably attach the support panel proximate its lower edge to the base panel allowing the upper edge of the support panel to swing downwardly and away from the base panel. It is further preferred that the support means further includes stop means to stop and support the support panel at a chosen acute angle with the base panel. It is also preferred that the means to releasably interlock the cart against the support means interlocks the support panel to the base panel in an upright position. It is further preferred that the cart include a pair of wheels rotatably attached to the body sufficient to allow the body to be tilted and moved on the wheels and means to provide support for the body as it rests on the ground on the wheels. It is also preferred that the cart include a handle that includes two integral upright members spaced apart from each other proximate sides of the body; that the upright members include lower sections, and that the handle be attached to the body by releasable handle locking means. It is also preferred that the cart include pivot means pivotally connecting median portions of the two upright members to the body allowing the handle to pivot raising the lower sections of the upright members upwardly and away from the body, and that the engaging means be attached to the lower sections of the upright members. It is further preferred that the engaging means include a horizontal rod spanning between the lower ends of the two vertical members of the handle. It is preferred that the mounting means include a pair of openings cut into a pair of vertical edges of a member with the openings depending downwardly into the member.

Another aspect of the invention is a cart device that includes support means attachable to an outside portion of a motor vehicle to releasably support a cart off the ground on the outside of the motor vehicle. The support means includes mounting means to provide both vertically upward and horizontal support at two separate positions on the support means. The cart includes a body that includes a platform, a pair of wheels rotatably attached to the body sufficient to allow the body to be titled and moved on the wheels, means to provide support for the body as it rests on the ground on the wheels, a handle that includes two integral upright members spaced apart from each other proximate sides of the body, the upright members that include lower sections, and the handle being attached to the body by releasable handle locking means, pivot means pivotally connecting median portions of the two upright members to the body allowing the handle to pivot raising the lower sections of the upright members upwardly and away from the body, and engaging means attached to the lower sections of the upright members to demountably engage to the mounting means on the support means.

Another aspect of the invention is a cart device that includes support means attachable to an outside portion of a motor vehicle to releasably support a cart off the ground on the outside of the motor vehicle. The support means includes a base panel, means to attach the base panel to the outside portion of a motor vehicle, a support panel that includes a lower edge, an upper edge, and mounting means to provide both vertically upward and horizontal support surfaces at two separated positions on the support panel, hinge attachment means to hingeably attach the support panel proximate its lower edge to the base panel allowing the upper edge of the support panel to swing downwardly and away from the base panel, stop means to stop and support the support panel at a chosen acute angle with the base panel, means to releasably interlock the support panel to the base panel in an upright position, and means to releasably interlock the cart to the support panel, while the cart includes a body that includes a platform, wheels rotatably attached to the body sufficient to allow the body to be moved on the wheels, and engaging means attached to the body to demountably engage to the mounting means on the support means to support the cart on the support panel.

Another aspect of this invention is a safety cart device for use on a roadway proximate an area where repair work is being carried out. The safety cart device includes support means attachable to a front portion of a repair motor vehicle to releasably support a safety cart off the ground on the front of the motor vehicle, and the safety cart that includes a body that includes means to hold safety road cones and a sign attached to a side of the body having a printed message thereon sufficient to warn approaching motorists that persons are working proximate the roadway. The safety cart further includes a pair of wheels rotatably attached to the body sufficient to allow the body to be tilted and moved on the wheels and means to provide support for the body as it rests on the ground on the wheels. The safety cart also includes a handle attached to the body sufficient to allow the safety cart to be tilted, balanced on the wheels and moved along the roadway, and at least one battery powered light attached to the body sufficient to warn approaching motorists.

Yet another aspect of the invention is a method of using a safety cart device on a roadway proximate an area where repair work is being carried out. The method includes providing a safety cart that includes a body that includes means to hold safety road cones and a sign attached to a side of the body having a printed message thereon sufficient to warn approaching motorists that persons are working proximate the roadway. The safety cart further includes a pair of wheels rotatably attached to the body sufficient to allow the body to be tilted and moved on the wheels, means to provide support for the body as it rests the ground on the wheels, and a handle attached to the body. The safety cart also includes at least one battery powered light attached to the body sufficient to warn approaching motorists. The method further includes equipping the safety cart with a sufficient supply of safety cones and supporting the safety cart off the ground on a front of a repair motor vehicle on support means attached to the front portion of the repair motor vehicle. The method then includes disengaging the safety cart from the front of the vehicle. The method further includes tilting the full safety cart to balance it on the wheels and moving it also the roadway and dispensing traffic cones along the roadway in the direction from which traffic is approaching. The method also includes placing the safety cart with the sign facing approaching motorists at a distance sufficient to warn the motorists of the work area.

Another aspect of the invention is a method of using a cart device that includes attaching support means to an outside portion of a motor vehicle to releasably support a cart off the ground on the outside of a motor vehicle, the support means that includes a mounting means to provide both vertically upward and horizontal support at two separated positions on the support means. The method further includes providing the cart that includes a body that includes a platform, a pair of wheels rotatably attached to the body, and body support means to provide support for the body as it rests on the ground on the wheels. The cart further includes a handle that includes two integral upright members spaced apart from each other proximate sides of the body, the upright members that include lower sections, and the handle being attached to the body by releasable handle locking means, pivot means pivotally connecting median portions of the two upright members of the body, and engaging means attached to the lower sections of the upright members. The method further includes grasping the handle and tilting the body sufficiently to raise the body support means off the ground and moving the device on the wheels to a position in front of the attaching support means. The method also includes releasing the handle locking means, pivoting the handle downwardly to release the lower sections of the upright members upwardly and away from the body and aligning the engaging means with the mounting means on the support means, and engaging the engaging means to the mounting means on the support means. The method further includes pivoting the handle upwardly to raise the safety cart off the ground onto the outside of the motor vehicle, and releasably attaching the safety cart to the support means on the motor vehicle.

BRIEF DESCRIPTION OF THE DRAWINGS

FIG. 3 is a side elevational view of the cart device illustrated in FIG. 2 with the handle pivoted downwardly in order to ready the engaging means to demountably engage to the mounting means on the support means on the vehicle.

FIG. 4 is a perspective view of a support device attached on a cut-away view of the motor vehicle ready to receive the safety cart illustrated in the preceding figures.

FIG. 5 is a perspective view of the support device illustrated in FIG. 4 pivoted downwardly to show the tilting mechanism to allow the motor hood of the vehicle to be tilted forwardly.

FIG. 6 is a partial cross-sectional view taken along line 6—6 of FIG. 3 showing engagement between the support panel and the base panel holding it in a vertical position to the front of the vehicle.

DESCRIPTION OF PREFERRED EMBODIMENTS

Figure 1:
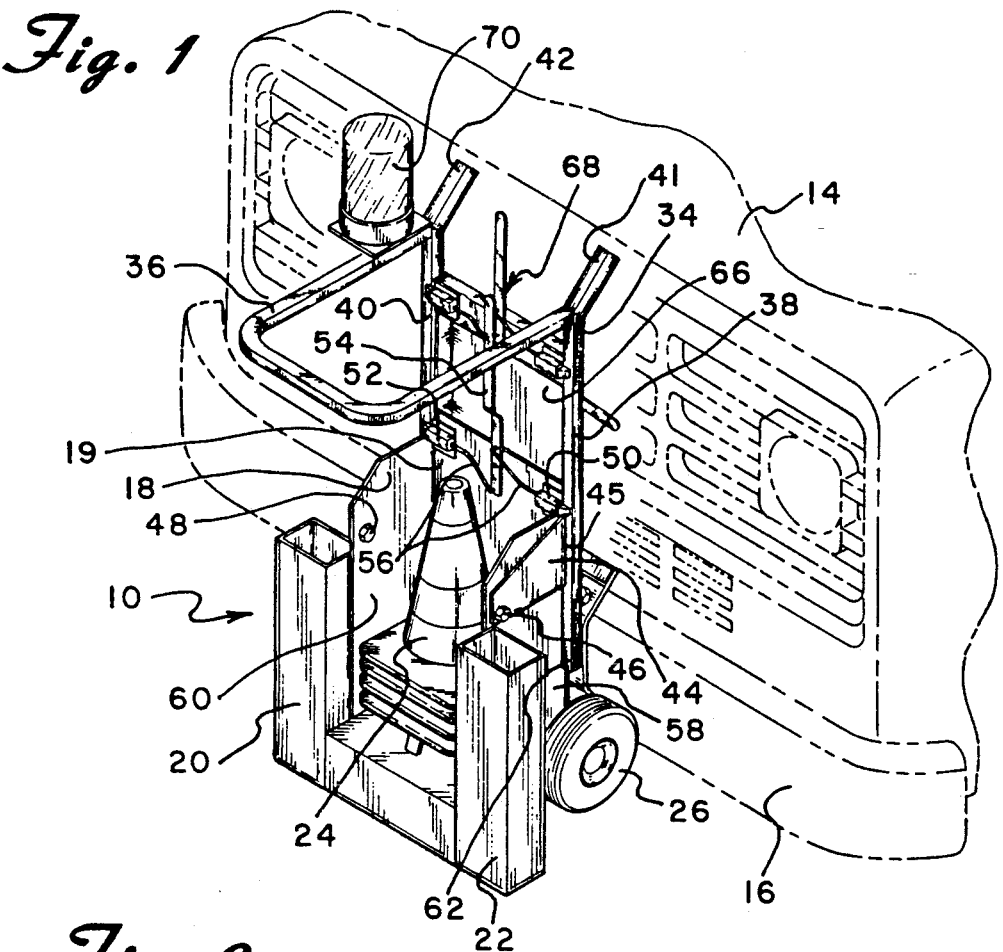
FIG. 1 is a perspective view of the front of a motor vehicle with a cart device of the present invention attached thereto.
Figure 2:
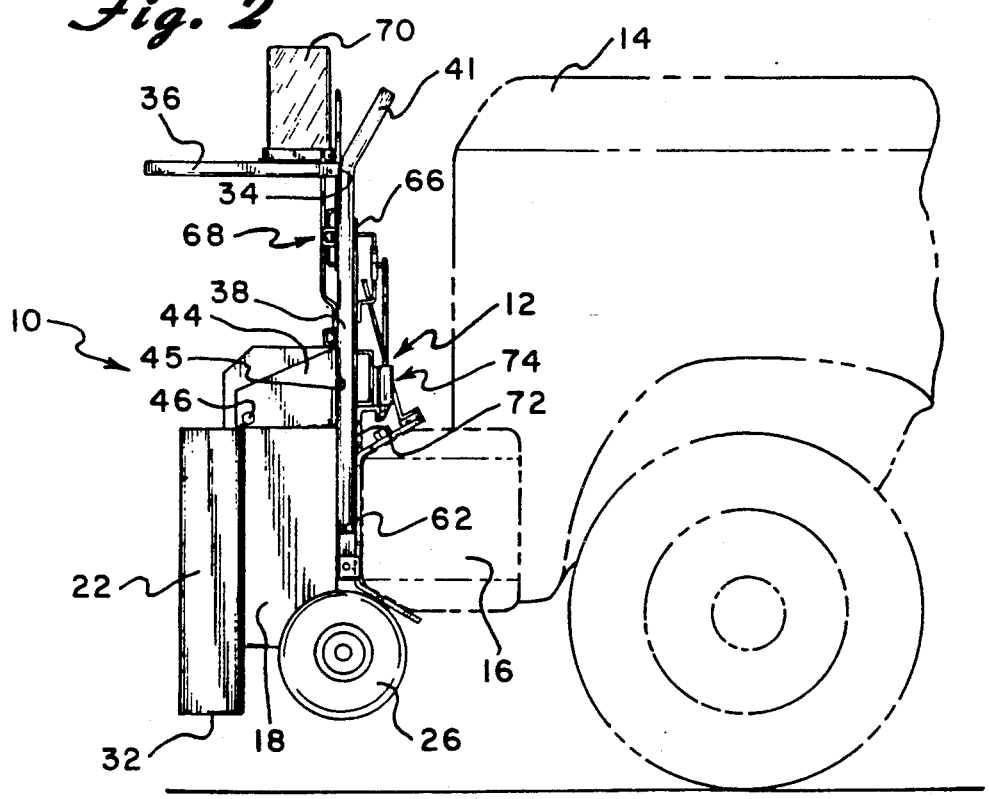
FIG. 2 is a side elevational view of the cart device the vehicle as illustrated in FIG. 1.
Figure 7:
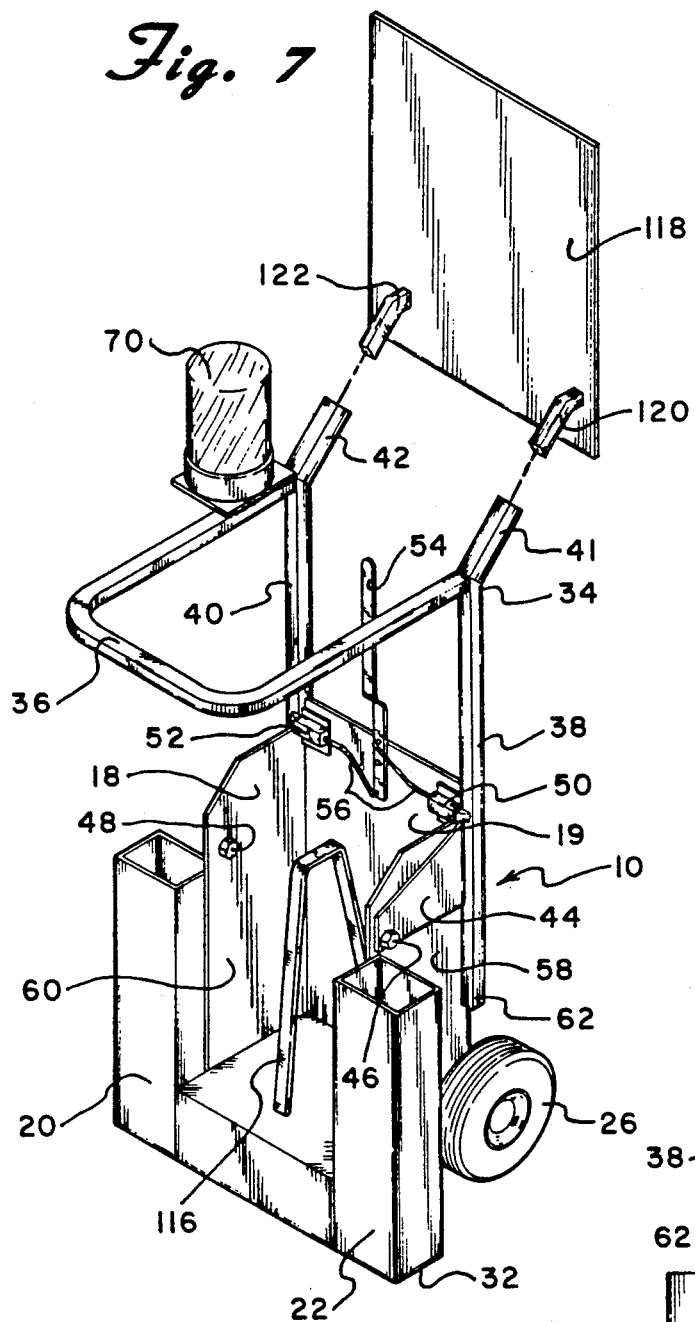
FIG. 7 is a perspective view of a safety cart of the present invention.
Figure 8:
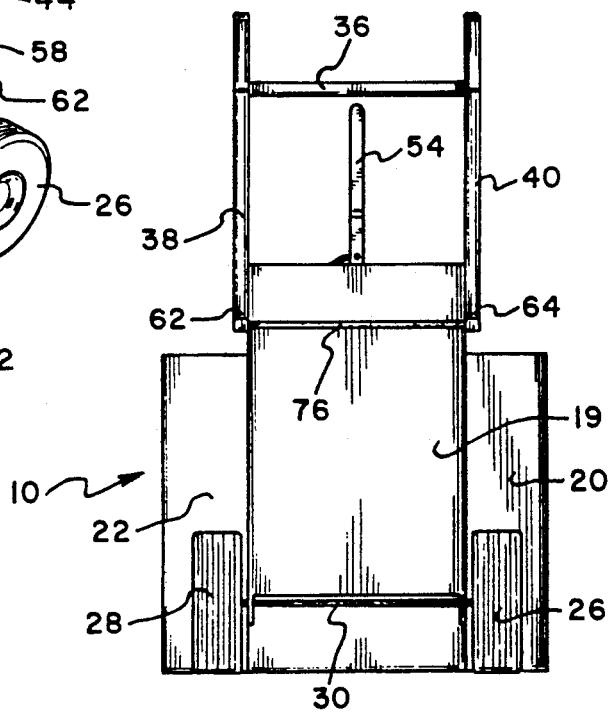
FIG. 8 is a rear elevational view of the safety cart illustrated in FIG. 7.

As illustrated in FIG. 1, cart device 10 is shown supported on and interlocked to support device 12 which is mostly hidden in this view but is clearly shown in FIGS. 2 through 5. Support device 12 is attached to bumper 16 of truck cab 14 through mechanisms more clearly shown in later drawings. Cart 10 includes body 18 with rear vertical wall 19 abutting the front of truck cab 14. Compartments 20 and 22 are attached to body 18 to store flags, flag standards and other sign components. A substantial supply of cones 24 may be stored in body 18 although only a few are shown in this view for the purposes of clarification. Wheels 26 and 28 are attached on axle 30 which in turn is connected through downward extensions of body 18 as shown in FIG. 8. Bottom 32 of compartment 22 extends downwardly from body 18 to about the same height as the contact surface of wheels 26 and 28 which constitute means to support the body as it rests on the ground on the wheels. Integral handle 34 is basically an "L" shape from the side view with horizontal "U" shaped section 36 extending forwardly and connecting the open ends of that shape with upper ends of vertical handle members 38 and 40 which extend downwardly on the outside of both sides of body 18. Angled extensions 41 and 42 extend from upper corners of handle 34 at the joinder connections between section 36 and sections 38 and 40. Extensions 41 and 42 have open ends and extend upwardly about sixty degrees from horizontal. The entire handle 34 is constructed of one inch square steel tubing with a wall thickness of about one-eighth inch. The cart body is constructed of five-sixteenths inch steel plate with all connected edges welded together. Vertical attachment panel 44 is welded lengthwise along a median section of handle member 38 along line 45. Attachment panel 44 extends forwardly with an inside face abutting the outer face of vertical body panel 58 of body 18. Pivot pin 46 extends through holes of both panels 44 and 58 allowing panel 44 to pivot upwardly and forwardly bringing "U" shaped section 36 into a horizontal position as illustrated in FIG. 3. An identical vertical attachment panel hidden behind vertical side body panel 60 identically connected through pivot pin 48 supports vertical handle section 40 and allows it to pivot downwardly so that entire integral handle 34 pivots downwardly raising lower end 62 of vertical handle member 38. Likewise, although hidden in this view and illustrated in FIG. 8, lower end 64 of vertical handle member 40 is raised at the same time as the entire handle is an integral unit. Spring locks 50 and 52 are welded to the inside surface of rear vertical wall body panel 19 each with spring loaded piston lock surfaces extending outwardly to engage the front surfaces of handle members 38 and 40. Unlocking member 54 with upraised extension is attached through connector links 56 through the rear of the horizontal piston members to allow handle 34 to be locked or unlocked to body 18. Flashing electric lantern 70 is attached to horizontal handle member 36. As shown here, the lantern has an internally protected battery system in the base of the lantern, however, any commercially available flashing lantern may be utilized including those with external battery cases connected by wires with the case stored in the body of device 10. Device 10 is attached to support panel 66 of support device 12 by interlock device 68 shown in FIGS. 2 and 3 and more clearly in FIG. 4. As shown in FIG. 2, more clearly in FIG. 4 and most clearly in FIG. 5, support panel interlock device 74 is attached directly to bumper 16 of vehicle 14. Vertical support panel 66 is releasably interlocked to base panel 72 by support panel interlock device 74 which is most clearly shown in FIG. 5. As illustrated in FIG. 3, device 10 has been rolled on wheels 26 and 28 to a position proximate support panel 66 on the front of vehicle 14. Handle 34 has been rotated downwardly to position section 36 in an almost vertical position raising lower ends 62 and 64 upwardly to a height proximate mounting openings 78 and 80, the latter being illustrated in FIG. 4. Horizontal rod 76, shown in FIG. 3 as an end shadow view and more fully in FIG. 8, is positioned to engage in the horizontal openings of mounting openings 78 and 80 which open horizontally and then vertically providing vertical upward and horizontal support for rod 76. Cart 10 is pushed toward support panel 66 such that rod 76 engages in openings 78 and 80. Handle 34 is then rotated upwardly leveraging cart device 10 upwardly and toward panel 66 until vertical handle sections 38 and 40 engage in interlock device 68 on support panel 66 interlocking device 10 to device 12. At the same time, when handle 34 is rotated upwardly, the median sections of handle sections 38 and 40 engage spring locks 50 and 52 interlocking to body 18 forming a releasably integral unit. While device 10 is being installed on support device 12, support panel 66 is releasably interlocked through device 74 to base panel 72. As will be illustrated and described below, support panel 66 may be partially disengaged from base panel 72 whether device 10 is installed on it or not. Since truck cab 14 may well tilt forwardly and downwardly to reach the motor for repair, support panel 66 would be in the way of that movement. As a consequence, support panel 66 is pivotally connected to base panel 72 through pivot rod 82 held in a vertical position by support panel interlock device 74. As shown in FIG. 4, unless access to the truck cab is required, support panel 66 is held in a vertical position exposing interlock device 68 which includes horizontally mounted spring locks 84 and 86 with beveled piston members extending outwardly past the outer edges of support panel 66 to engage handle members 38 and 40 when device 10 is installed thereon. Interlock release member 88 is connected through horizontal links 90 to the rear of the spring loaded piston member to release the interlocks by pulling the pistons inwardly away from the engagement of the vertical handle members. As shown in FIG. 5, support panel 66 has been pivoted downwardly on pivot rod 82 which is engaged in vertical forward extending tabs 92 and 94 as extensions of base panel 72 which is bolted bumper 16 by bolts 96. Although support panel 66 is shown pivoted downwardly to a horizontal position, it more commonly is held at about a forty-five degree angle by "T" shaped support member 98 which extends forwardly from base panel 72 and engages at an angle in vertically upward flange members 100. Support panel interlock device 74 includes spring locks 102 and 104 which are attached to the rear surface of support panel 66 with beveled spring loaded piston interlocking members extending downwardly when panel 66 is in a vertical position. These piston members engage vertically disposed surface 108 of section 106 of base panel 72 as shown in FIG. 6. Horizontal interlock member 110 when moved upwardly according to the arrow, pulls connector links 112 upwardly which are connected to the rear sections of pistons 114 which are spring loaded to remain in the position illustrated in FIG. 6 except when pulled by connector 112 or the beveled surface engages the front upper corner of section 106 as support panel 66 is pulled to a vertical position. In FIG. 7, the enlarged view better shows the pivoting of handle 34 and the interlocking of the handle to rear vertical wall 19 of body 18. Further, with cones 24 removed, inverted "V" shaped member 116 is uncovered to illustrate how the cones are held in position. The cart may store up to about twenty cones. Sign 118 is shown exploded away from attachment with device 10 and how it is held in a vertical position interconnected into extensions 41 and 42. Male pin members 120 and 122 extend downwardly at about sixty degrees from the horizontal to interfit into the open ends of extensions 41 and 42. The combination of the angles of the extensions and pin members position sign 118 in a vertical position. It should be clear that sign 118 may be considerably larger as device 10 is very bottom heavy and provides good support against gusting winds. Further, sign 18 may be illuminated with flashing lights along its upper edges connected to batteries that rest in the bottom of body 18 to provide further weight balance. Flashing illuminated signs with arrows or warnings may also be utilized. Hinged feet may also be extended from the base of device 10 to provide additional support. These feet are swung upwardly against or into body 18 when not in use.

While this invention has been described with reference to the specific embodiments disclosed herein, it is not confined to the details set forth and the patent is intended to include modifications and changes which may come within and extend from the following claims.

I claim:
1. A cart device comprising:
    (a) support means attachable to an outside portion of a motor vehicle to releasably support a detachable cart off the ground on the outside of the motor vehicle, the support means comprising:
        (i) mounting means to provide a vertically upward bearing surface and means to prevent an engaging means on the cart from slipping horizontally off the bearing surface, and
        (ii) means to releasably interlock the cart to the support means and prevent vertically upward movement of the cart in relation to the mounting means, and
    (b) the cart comprising:
        (i) a body comprising a platform,
        (ii) at least two wheels rotatably attached to the body, wherein the wheels are positioned to allow the body to be moved on the wheels,
        (iii) leveraging means comprising a lever member comprising a lower section, the lever member being pivotally attached at a median portion thereof to the body to provide leverage to lift the cart upwardly off the ground to the support means, and
        (iv) said engaging means being attached proximate the lower section of the lever member to demountably engage into and be supported by the mounting means.
2. The device of claim 1 wherein the support means further comprises:
    (i) a base panel,
    (ii) means to attach the base panel vertically to the outside portion of a motor vehicle,
    (iii) a support panel comprising a lower edge and an upper edge, wherein the mounting means is on the support panel and the means to releasably interlock the cart to the support means interlocks the cart to the support panel, and
    (iv) hinge attachment means to hingeably attach the support panel proximate its lower edge to the base panel allowing the upper edge of the support panel to swing downwardly and away from the base panel.
3. The device of claim 2 wherein the support means further comprises:
    (i) stop means to stop and support the support panel at a chosen acute angle with the base panel, and
    (ii) means to releasably interlock the support panel to the base panel in an upright position.
4. The device of claim 1 wherein the cart further comprises:

(i) a pair of wheels rotatably attached to the body, wherein the wheels are positioned to allow the body to be tilted and moved on the wheels, and (ii) means to provide support for the body as it rests on the ground on the wheels.

5. The device of claim 1 wherein the cart further comprises:
(i) a handle comprising to said lever members comprising two upright members spaced apart from each other proximate sides of the body, the upright members comprising said lower sections, and the handle being attached to the body by releasable handle locking means, and
(iii) pivot means pivotally connecting median portions of the two upright members to the body allowing the handle to pivot raising the lower sections of the upright members upwardly and away from the body,
wherein the engaging means is attached to the lower sections of the upright members.

6. The device of claim 1 wherein the cart further comprises sign mounting means to support a sign extending upwardly from the cart.

7. The device of claim 6 wherein the cart further comprises lighting means to illuminate the sign.

8. The device of claim 5 wherein the cart further comprises sign mounting means comprising extensions of the handle with openings at ends of the extensions.

9. A cart device comprising:
(a) support means attachable to an outside portion of a motor vehicle to releasably support a detachable cart off the ground on the outside of the motor vehicle, the support means comprising:
(i) mounting means to provide a vertically upward bearing surface and means to prevent an engaging means on the cart from slipping horizontally off the bearing surface, and
(ii) means to releasably interlock the cart to the support means and prevent vertically upward movement of the cart in relation to the mounting means, and
(b) the cart comprising:
(i) a body comprising a platform,
(ii) a pair of wheels rotatably attached to the body, wherein the wheels are positioned to allow the body to be tilted and moved on the wheels,
(iii) means to provide support for the body as it rests on the ground on the wheels,
(iv) a handle comprising two integral upright members spaced apart from each other proximate sides of the body, the upright members comprising lower sections, and the handle being attached to the body by releasable handle locking means,
(v) pivot means pivotally connecting median portions of the two upright members to the body allowing the handle to pivot raising the lower sections of the upright members upwardly and away from the body, and
(vi) said engaging means being attached to the lower sections of the upright members to demountably engage to the mounting means on the support means.

10. The device of claim 9 wherein the support means further comprises:
(i) a base panel,
(ii) means to attach the base panel to the outside portion of a motor vehicle,
(iii) a support panel comprising a lower edge and an upper edge, wherein the mounting means is on the support panel and the means to releasably interlock the cart to the support means interlocks the cart to the support panel,
(iv) hinge attachment means to hingeably attach the support panel proximate its lower edge to the base panel allowing the upper edge of the support panel to swing downwardly and away from the base panel,
(v) stop means to stop and support the support panel at a chosen acute angle with the base panel, and
(vi) means to releasably interlock the support panel to the base panel in an upright position.

11. The device of claim 9 wherein the support means further comprises:
(i) a base panel,
(ii) means to attach the base panel to the outside portion of a motor vehicle,
(iii) a support panel comprising a lower edge and an upper edge, wherein the mounting means is on the support panel and the means to releasably interlock the cart to the support means interlocks the cart to the support panel, and
(iv) hinge attachment means to hingeably attach the support panel proximate its lower edge to the base panel allowing the upper edge of the support panel to swing downwardly and away from the base panel.

12. The device of claim 9 wherein the cart further comprises sign mounting means to support a sign extending upwardly from the cart.

13. The device of claim 12 wherein the cart further comprises lighting means to illuminate the sign.

14. The device of claim 9 wherein the cart further comprises sign mounting means comprising extensions of the handle with openings at ends of the extensions.

15. A cart device comprising:
(a) support means attachable to an outside portion of a motor vehicle to releasably support a detachable cart off the ground on the outside of the motor vehicle, the support means comprising:
(i) a base panel,
(ii) means to attach the base panel vertically to the outside portion of a motor vehicle,
(iii) a support panel comprising a lower edge and an upper edge,
(iv) mounting means on the support panel to provide two vertically upward bearing surfaces at two separated positions on the support panel and means to prevent an engaging means on the cart bearing on the bearing surfaces from slipping horizontally off the bearing surfaces,
(v) hinge attachment means to hingeably attach the support panel proximate its lower edge to the base panel allowing the upper edge of the support panel to swing downwardly and away from the base panel,
(vi) stop means to stop and support the support panel at a chosen acute angle with the base panel,
(vii) means to releasably interlock the support panel to the base panel in an upright position, and
(viii) means to releasably interlock the cart to the support panel, and
(b) the cart comprising:
(i) a body comprising a platform, (ii) wheels rotatably attached to the body, wherein the wheels are positioned to allow the body to be moved on the wheels, and (iii) said engaging means being attached to the body to demountably engage to the mounting means on the support means to support the cart on the support panel.

16. The device of claim 15 wherein the cart further comprises:

(i) a handle comprising two integral upright members paced apart from each other proximate sides of the body, the upright members comprising lower sections, and the handle being attached to the body by releasable handle locking means, and (ii) pivot means pivotally connecting median portions of the two upright members to the body allowing the handle to pivot raising the lower sections of the upright members upwardly and away from the body, where the engaging means is attached to the lower sections of the upright members.

17. A safety cart device for use on a roadway proximate an area where repair work is being carried out, the safety cart device comprising:

(a) support means attachable to a front portion of a repair motor vehicle to releasably support a safety cart off the ground on the front of the motor vehicle, and (b) the safety cart comprising:

(i) a body comprising means to hold safety road cones and prevent the cones from slipping off the body, (ii) a sign having a printed message thereon sufficient to warn approaching motorists that persons are working proximate the roadway, (iii) a pair of wheels rotatably attached to the body, wherein the wheels are positioned to allow the body to be tilted and moved on the wheels, (iv) means to provide support for the body as the body rests on the ground on the wheels, (v) a handle attached to the body so that the safety cart can be tilted, balanced on the wheels and moved along the roadway, (vi) sign mounting means comprising vertical extensions of the handle with top openings at ends of the extensions, and (vii) at least one battery powered light attached to the safety cart sufficient to warn approaching motorists.

18. A method of using a safety cart device on a roadway proximate an area where repair work is being carried out, the method comprising:

(a) providing a safety cart comprising:

(i) a body comprising means to hold safety road cones, (ii) a sign attached to the safety cart having a printed message thereon sufficient to warn approaching motorists that persons are working proximate the roadway, (iii) a pair of wheels rotatably attached to the body, wherein the wheels are positioned to allow the body to be tilted and moved on the wheels, (iv) means to provide support for the body as the body rests on the ground on the wheels, (v) a handle attached to the body, and (vi) at least one battery powered light attached to the safety cart sufficient to warn approaching motorists,.

(b) equipping the safety cart with a sufficient supply of safety cones, (c) supporting the safety cart off the ground on a front of a repair motor vehicle on support means attached to the front portion of the repair motor vehicle, (d) disengaging the safety cart from the front of the vehicle.

(e) tilting the full safety cart to balance the safety cart on the wheels and moving the safety cart along the roadway, (f) dispensing traffic cones along the roadway in the direction from which traffic is approaching, and (g) placing the safety cart with the sign facing approaching motorists at a distance sufficient to warn the motorists of the work area.

19. A method of using a cart device comprising:

(a) attaching support means to an outside portion of a motor vehicle to releasably support a detachable cart off the ground on the outside of the motor vehicle, the support means comprising mounting means to provide two vertically upward bearing surfaces at two separated positions on the support panel and means to prevent an engaging means on the cart bearing on the bearing surfaces from slipping horizontally off the bearing surfaces, (b) providing the cart comprising:

(i) a body comprising a platform, (ii) a pair of wheels rotatably attached to the body, (iii) body support means to provide support for the body as it rests on the ground on the wheels, (iv) a handle comprising two integral upright members spaced apart from each other proximate sides of the body, the upright members comprising lower sections, and the handle being attached to the body by releasably handle locking means, (v) pivot means pivotally connecting median portions of the two upright members to the body, and (vi) said engaging means being attached to the lower sections of the upright members, (c) grasping the handle and tilting the body sufficiently to raise the body support means off the ground.

(d) moving the cart on the wheels to a position in front of the support means, (e) releasing the handle locking means, (f) pivoting the handle downwardly to raise the lower sections of the upright members upwardly and away from the body and aligning the engaging means with the mounting means on the support means, (g) engaging the engaging means to the mounting means on the support means, (h) pivoting the handle upwardly to raise the safety cart off the ground onto the outside of the motor vehicle, and (i) releasably attaching the safety cart to the support means on the motor vehicle.

20. A cart device comprising:

(a) support means attachable to an outside portion of a motor vehicle to releasably support a detachable cart off the ground on the outside of the motor vehicle, the support means comprising:

(i) mounting means to provide a vertically upward bearing surface and means to prevent an engaging means on the cart from slipping horizontally off the bearing surface, and (ii) means to releasably interlock the cart to the support means and prevent vertically upward movement of the cart in relation to the mounting means, and (b) the cart comprising:
(i) a body comprising a platform,
(ii) at least two wheels rotatably attached to the body, wherein the wheels are positioned to allow the body to be moved on the wheels,
(iii) a handle comprising two upright members spaced apart from each other proximate sides of the body, the upright members comprising lower sections, and the handle being attached to the body by releasable handle locking means, and
(iv) pivot means pivotally connecting median portions of the two upright members to the body allowing the handle to pivot raising the lower sections of the upright members upwardly and away from the body,
(v) said engaging means being attached to the lower sections of the upright members to demountably engage to the mounting means on the support means, and
(vi) wherein the upright members provide leverage to lift the cart upwardly to the support means while the engaging means is engaged in the mounting means to support the cart on the support means.

* * * * *